United States Patent
Cho

(10) Patent No.: US 9,421,842 B2
(45) Date of Patent: Aug. 23, 2016

(54) METHOD FOR CONTROLLING SUSPENSION SYSTEM

(71) Applicant: HYUNDAI MOTOR COMPANY, Seoul (KR)

(72) Inventor: Jae Sung Cho, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 8 days.

(21) Appl. No.: 14/570,733

(22) Filed: Dec. 15, 2014

(65) Prior Publication Data

US 2016/0107499 A1  Apr. 21, 2016

(30) Foreign Application Priority Data

Oct. 15, 2014  (KR) .................. 10-2014-0139294

(51) Int. Cl.
*B60G 17/016* (2006.01)
*B60G 17/0165* (2006.01)
*B60G 17/018* (2006.01)

(52) U.S. Cl.
CPC .......... *B60G 17/0161* (2013.01); *B60G 17/018* (2013.01); *B60G 17/0162* (2013.01); *B60G 17/0165* (2013.01); *B60G 2400/10* (2013.01); *B60G 2800/91* (2013.01); *B60G 2800/9122* (2013.01)

(58) Field of Classification Search
CPC .......... B60G 17/016; B60G 2400/102; B60G 2800/012; B60G 2500/10; G05D 1/0841
USPC ............. 701/37, 38; 280/5.512, 5.513, 5.518, 280/5.507; 244/195
See application file for complete search history.

(56) References Cited

U.S. PATENT DOCUMENTS

| | | | |
|---|---|---|---|
| 2007/0150144 A1 | 6/2007 | Yasui | |
| 2014/0195116 A1* | 7/2014 | Hrovat | B60W 10/06 701/38 |
| 2014/0330483 A1* | 11/2014 | Lu | B60G 17/015 701/37 |
| 2015/0112550 A1 | 4/2015 | Cho et al. | |

FOREIGN PATENT DOCUMENTS

| | | |
|---|---|---|
| JP | 2005-238971 A | 9/2005 |
| JP | 2007-245887 A | 9/2007 |
| JP | 2010-158960 A | 7/2010 |
| KR | 10-2007-0076263 A | 7/2007 |
| KR | 10-2008-0090785 A | 10/2008 |
| KR | 10-2013-0052790 A | 5/2013 |
| KR | 10-2013-0123951 A | 11/2013 |
| KR | 10-1470221 B1 | 12/2014 |
| KR | 10-2015-0054196 A | 5/2015 |
| KR | 10-1558761 B1 | 10/2015 |

\* cited by examiner

*Primary Examiner* — Gertrude Arthur Jeanglaud
(74) *Attorney, Agent, or Firm* — McDermott Will & Emery LLP

(57) ABSTRACT

A method for controlling a suspension system includes controlling an electronic controlled suspension device (ECS) and an active roll stabilizer (ARS) of a vehicle based on an input sensor value and a driving operation of the vehicle, the input sensor value is based on a road condition and wherein the driving operation is one of a straight driving, a normal turning, and an urgent turning of the vehicle.

11 Claims, 6 Drawing Sheets

| HANDLING ROAD | STRAIGHT DRIVING | NORMAL TURNING | URGENT TURNING |
|---|---|---|---|
| ROAD INPUT SIGNAL IS NOT GENERATED | ECS: CONTROL RIDING IMPRESSION (SOFT DAMPING MODE) <br><br> ARS: CONTROL RIDING IMPRESSION (DECOUPLE CONTROL MODE) | ECS: CONTROL HANDLING (ROLL CONTROL MODE) <br><br> ARS: CONTROL HANDLING (ROLL CONTROL MODE) | ECS: CONTROL HANDLING (US/OS CONTROL MODE) <br><br> ARS: CONTROL HANDLING (US/OS CONTROL MODE) |
| ROAD INPUT SIGNAL IS GENERATED | ECS: CONTROL RIDING IMPRESSION (SKY HOOK CONTROL MODE) <br><br> ARS: CONTROL RIDING IMPRESSION (ROLL DAMPING CONTROL MODE) | ECS: CONTROL HANDLING (SKY HOOK CONTROL MODE) <br><br> ARS: CONTROL HANDLING (ROLL CONTROL MODE) | ECS: CONTROL HANDLING (SKY HOOK CONTROL MODE) <br><br> ARS: CONTROL HANDLING (US/OS CONTROL MODE) |

| | STRAIGHT DRIVING | NORMAL TURNING | URGENT TURNING |
|---|---|---|---|
| ROAD INPUT SIGNAL IS NOT GENERATED | ECS:CONTROL RIDING IMPRESSION (SOFT DAMPING MODE)<br>ARS:CONTROL RIDING IMPRESSION (DECOUPLE CONTROL MODE) | ECS:CONTROL HANDLING (ROLL CONTROL MODE)<br>ARS:CONTROL HANDLING (ROLL CONTROL MODE) | ECS:CONTROL HANDLING (US/OS CONTROL MODE)<br>ARS:CONTROL HANDLING (US/OS CONTROL MODE) |
| ROAD INPUT SIGNAL IS GENERATED | ECS:CONTROL RIDING IMPRESSION (SKY HOOK CONTROL MODE)<br>ARS:CONTROL RIDING IMPRESSION (ROLL DAMPING CONTROL MODE) | ECS:CONTROL HANDLING (SKY HOOK CONTROL MODE)<br>ARS:CONTROL HANDLING (ROLL CONTROL MODE) | ECS:CONTROL HANDLING (SKY HOOK CONTROL MODE)<br>ARS:CONTROL HANDLING (US/OS CONTROL MODE) |

Fig.1

METHOD FOR CONTROLLING SUSPENSION SYSTEM

CROSS-REFERENCE TO RELATED APPLICATION

This application is based on and claims the benefit of priority to Korean Patent Application No. 10-2014-0139294, filed on Oct. 15, 2014 in the Korean Intellectual Property Office, the inventive concept of which is incorporated herein in its entirety by reference.

TECHNICAL FIELD

The present inventive concept relates to a method for controlling a suspension system, and more particularly, to a technology for controlling a suspension system for riding impression and driving stability performance.

BACKGROUND

In general, a vehicle including a 4 wheel drive (4WD) device mounted thereon does not include a measuring element for measuring a yaw moment for rotating the vehicle body in the left or right direction based on a central point of the vehicle, and thus front and rear driving force is simply distributed and controlled according to slip of a wheel.

Thus a problem arises in that a behavior of a vehicle is not controlled according to various driving conditions and road conditions.

An electronic stability control (hereinafter, ESC) apparatus controls a behavior of a vehicle using a yaw rate sensor for detecting a yaw moment and a lateral acceleration sensor for detecting a lateral acceleration of the vehicle, ensures driving stability of the vehicle using a control device during a vehicle turn, and applies an appropriate braking pressure according to frictional force of the road to four front, rear, right, and left wheels so as to prevent the vehicle from being unstable.

An electronic controlled suspension device (ECS) controls riding impression of a vehicle using a body vertical acceleration sensor for detecting a vertical acceleration of the vehicle body and a wheel vertical acceleration sensor for detecting a vertical acceleration of a wheel and controls handling of the vehicles using as much damping force of the ECS during a vehicle turn as possible. When handling of the vehicle is simply controlled via the ECS, a problem arises in that riding impression or driving stability is excessively degraded according road conditions.

SUMMARY

The present disclosure has been made to solve the above-mentioned problems occurring in the prior art while advantages achieved by the prior art are maintained intact.

Aspects and advantages of the present inventive concept are understood with reference to the following description and are more clearly understood with regard to embodiments of the present inventive concept. It is easily understood that the aspects and advantages of the present inventive concept are easily implemented by elements and combinations thereof shown in the claims.

According to an exemplary embodiment of the present inventive concept, a method for controlling a suspension system includes controlling an electronic controlled suspension device (ECS) and an active roll stabilizer (ARS) of a vehicle based on an input sensor value and a driving operation of the vehicle, wherein the input sensor value is based on a road condition, and wherein the driving operation is one of a straight driving, a normal turning, and an urgent turning of the vehicle.

In certain embodiments, during the straight driving of the vehicle, when a road input signal is not generated from a road, a control mode of the ECS may be a soft damping mode and a control mode of the ARS may be a decouple control mode.

In certain embodiments, during the straight driving of the vehicle, when a road input signal is generated from a road, a control mode of the ECS may be a sky hook control mode, and a control mode of the ARS may be a roll damping control mode.

In certain embodiments, during the normal turning of the vehicle, when a road input signal is not generated from a road, each of a control mode of the ECS and a control mode of the ARS may be a roll control mode.

In certain embodiments, during the normal turning of the vehicle, when a road input signal is generated from a road, a control mode of the ECS may be a sky hook control mode, and a control mode of the ARS may be a roll control mode.

During the urgent turning of the vehicle, when a road input signal is not generated from a road, a control mode of the ECS and a control mode of the ARS may each be a turning limit US/OS control mode.

During the urgent turning of the vehicle, when a road input signal is generated from a road, a control mode of the ECS may be a sky hook control mode, and a control mode of the ARS may be a turning limit US/OS control mode.

An aspect of the present inventive concept provides a method for controlling a suspension system. In certain embodiments, the method may include determining whether straight driving or turning is being performed, determining a road condition, and setting control modes of an electronic controlled suspension device (ECS) and an active roll stabilizer (ARS).

In certain embodiments, the method may also include determining a roll control moment and a yaw control moment.

In certain embodiments, if it is determined that straight driving is being performed and if a road input signal is detected, a low frequency road may be extracted and a roll damping force may be determined.

In certain embodiments, the step of determining the road condition may include determining a standardized average vehicle body acceleration, determining a standardized value of a difference between right and left vehicle body accelerations, determining a standardized wheel acceleration, computing the average of the standardized average vehicle body acceleration, the standardized value of the difference between the right and left vehicle body accelerations, and the standardized wheel acceleration, and outputting a road roughness value.

In certain embodiments, the step of determining a roll control moment and a yaw control moment may include computing a yaw moment $M_{zeq}$ using the equation $$M_{zeq} = -I_z\left(-\frac{2(l_f C_f - l_r C_r)}{I_z v_x}v_y - \frac{2(l_f^2 C_f - l_r^2 C_r)}{I_z v_x}r + \frac{2C_f L_f}{I_z}\delta_f\right) + I_z$$

which $l_f$ denotes a distance to a front wheel axis from a vehicle center, $l_r$ denotes a distance to a rear wheel axis from the vehicle center, $I_z$ denotes a yaw moment of inertia, $C_f$ denotes a cornering stiffness of a front wheel tire, $C_r$ denotes a cornering stiffness of a rear wheel tire, $\delta_f$ denotes a steering angle, $V_x$ denotes a longitudinal vehicle body speed, and $V_y$ denotes a lateral vehicle body speed.

In certain embodiments, a suspension system integrated control mode may be determined before the step of determining a roll control moment and a yaw control moment.

In certain embodiments, the method for controlling the suspension system may further include distributing the roll control moment and the yaw control moment to the ARS and the ECS.

BRIEF DESCRIPTION OF THE DRAWINGS

The above and other objects, features and advantages of the present inventive concept will be more apparent from the following detailed description taken in conjunction with the accompanying drawings.

FIG. 1 is a diagram for explanation of a method for controlling a suspension system according to an exemplary embodiment of the present inventive concept.

DETAILED DESCRIPTION

Figure 2:
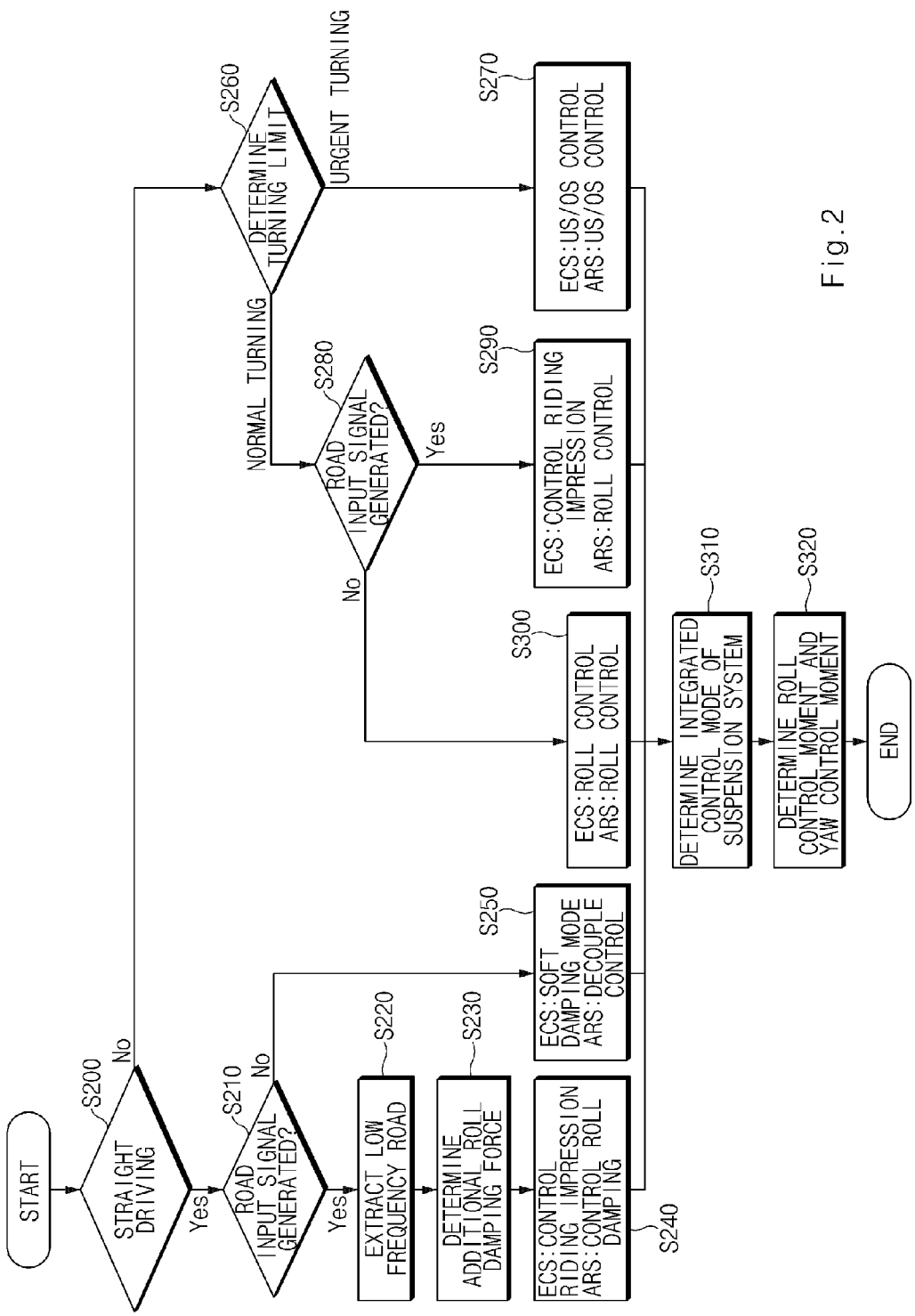
FIG. 2 is a flowchart of a method for determining a control mode of a suspension system according to straight driving and turning of a vehicle, and a road condition according to an embodiment of the present inventive concept.

Exemplary embodiments will now be described more fully with reference to the accompanying drawings to clarify aspects, features and advantages of the present inventive concept so as for those of ordinary skill in the art to easily implement with reference to the accompanying drawings. In the following description of the present inventive concept, a detailed description of known functions and configurations incorporated herein will be omitted when it may make the subject matter of the present inventive concept unclear. The present inventive concept will now be described more fully with reference to the accompanying drawings, in which exemplary embodiments of the present inventive concept are shown.

FIG. 1 is a diagram for explanation of a method for controlling a suspension system according to an embodiment of the present inventive concept.

Referring to FIG. 1, a control mode of an electronic controlled suspension device (ECS) and an active roll stabilizer (ARS) may be selected according to straight driving, turning of the vehicle, and road conditions.

Riding impression or handling of a vehicle may be controlled according to a mode that is classified into straight driving, normal turning, and urgent turning. That is, it is not necessary to control vehicle handling during straight driving, and it is necessary to control vehicle handling during normal turning and urgent turning.

In addition, riding impression or handing of the vehicle may be controlled according to road conditions. The ECS or ARS of the vehicle may determine whether a road is uniform according to whether an input signal of the road is generated. That is, during vehicle driving, when the road is uniform, the road input signal is not generated from the road, and when the road is not uniform, the road input signal is generated from the road, and thus a degree of roughness of a road condition may be determined.

First, during straight driving of the vehicle, configuration of a control mode is varied according to whether the road input signal is or is not generated from the road.

During straight driving of the vehicle, when the road input signal is not generated from the road, a control mode of the ECS may be a soft damping mode and a control mode of ARS may be a decouple control mode for controlling riding impression of the vehicle.

However, during straight driving of the vehicle, when the road input signal is generated, the ECS road, the ECS enters a sky hook control mode for controlling riding impression of the vehicle and the ARS enters a roll damping control mode for controlling riding impression of the vehicle.

Then, during normal turning of the vehicle, configuration of a control mode is varied according to whether the road input signal is or is not generated from the road.

During normal turning of the vehicle, when the road input signal is not generated from the road, the ECS enters a roll control mode for controlling handling of the vehicle and the ARS enters a roll control mode for controlling handling of the vehicle.

However, during normal turning of the vehicle, when the road input signal is generated from the road, the ECS enters a sky hook control mode for controlling riding impression of the vehicle and the ARS enters a roll control mode for controlling handling of the vehicle.

Then, during urgent turning of the vehicle, configuration of a control mode is varied according to whether the road input signal is or is not generated from the road.

During urgent turning of the vehicle, when the road input signal is not generated from the road, the ECS enters a turning limit US/OS control mode for controlling handling of the vehicle and the ARS enters a turning limit US/OS control mode for controlling handling of the vehicle.

However, during urgent turning of the vehicle, when the road input signal is generated from the road, the ECS enters a sky hook control mode for controlling riding impression of the vehicle and the ARS enters a turning limit US/OS control mode for controlling handling of the vehicle.

The vehicle may simultaneously enhance the handling and riding impression of the vehicle in consideration of a driving operation (straight driving or turning) and a road condition.

FIG. 2 is a flowchart of a method for determining a control mode of a suspension apparatus according to straight driving and turning of a vehicle, and a road condition according to an embodiment of the present inventive concept.

Referring to FIG. 2, a control mode of an ECS and an ARS may be determined according to straight driving and turning of a vehicle, and a road condition.

Whether straight driving of the vehicle is performed is determined (S200).

Then a road condition is determined during straight driving of the vehicle (S210).

Then the road condition of the vehicle is determined, and when a road input signal is generated from the road, a low frequency road is extracted and an additional roll damping force is determined (S220 and S230).

Then after the additional roll damping force is determined, control modes of the ARS and the ECS become a roll damping control mode and a sky hook control mode for controlling riding impression of the vehicle, respectively (S240).

However, the road condition of the vehicle is determined, and when a road input signal is not generated from the road, the control mode of the ECS becomes a soft damping mode and the control mode of the ARS becomes a decouple control mode for controlling riding impression of the vehicle (S250).

When the vehicle does not perform straight driving, whether the vehicle performs normal turning or urgent driving is determined (S260).

Then when the vehicle performs urgent turning, the control modes of the ECS and the ARS become a turning limit US/OS control mode for controlling handling of the vehicle (S270).

However, when the vehicle performs normal turning, a road condition is determined and whether the road input signal is generated from the road is determined (S280).

The road condition of the vehicle is determined, and when a road input signal is generated from the road, the control modes of the ECS and the ARS become a sky hook control mode for controlling riding impression of the vehicle and a roll control mode for controlling handling, respectively (S290).

However, the road condition of the vehicle is determined, and when a road input signal is not generated from the road, the control modes of the ECS and the ARS become a roll control mode for controlling handling of the vehicle (S300).

Then when the road condition of the vehicle is determined and the control modes of the ECS and the ARS are determined, a suspension system integrated control mode is determined (S310). The suspension system integrated control mode is classified into steps 0 to 4 and a control state of a separate controller is determined according to the integrated control mode.

Then after the integrated control mode is determined, a roll control moment and yaw control moment corresponding to the integrated control mode are determined (S320).

Figure 3:
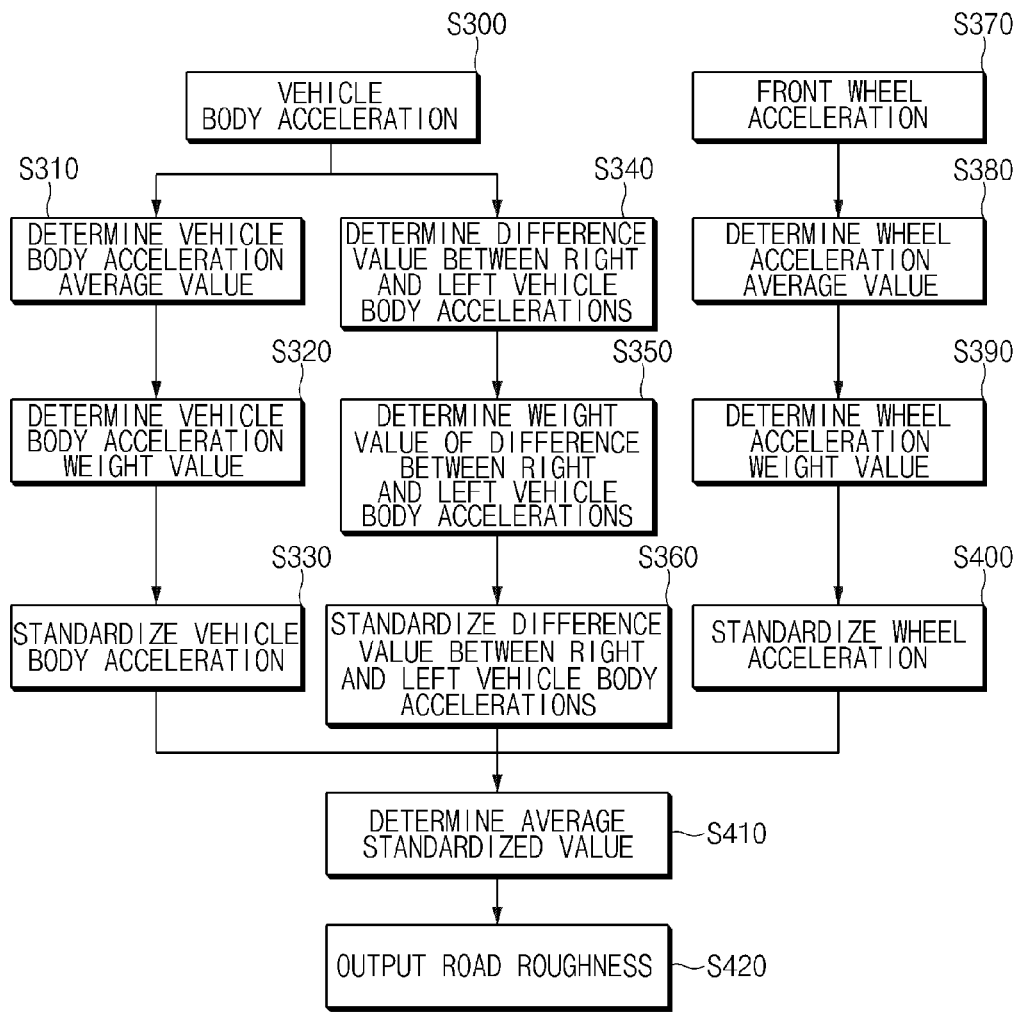
FIG. 3 is a diagram for explanation of a method for determining a road condition according to an embodiment of the present inventive concept.

FIG. 3 is a diagram for explanation of a method for determining a road condition according to an embodiment of the present inventive concept.

Referring to FIG. 3, the road condition of the vehicle may be determined by estimating a rough degree (uniform degree) of the road from right and left vehicle body acceleration sensor values and right and left wheel acceleration sensor values of a front wheel of the vehicle.

First, right and left vehicle body accelerations are determined (S300).

A vehicle body acceleration average value is determined from the determined right and left vehicle body accelerations (S310).

Then a vehicle body acceleration weight value is determined from the determined vehicle body acceleration average value (S320). Here, a method for calculating the vehicle body acceleration weight value may process a filter and reflect a weight value in order to reflect sensitivity characteristics for vibration by a driver.

Then the vehicle body acceleration weight value may be standardized to a maximum value of a vehicle body acceleration sensor (S330).

In addition, a difference value between right and left vehicle body accelerations is determined from the determined right and left vehicle body accelerations (S340).

Then the difference value between right and left vehicle body accelerations is determined and a weight value of the difference value between right and left vehicle body accelerations is determined (S350).

Then the weight value may be standardized to a maximum value of a vehicle body acceleration sensor (S360). Here, the maximum value of the vehicle body acceleration sensor may be ±1 G.

In addition, right and left wheel accelerations are determined (S370).

Then a wheel acceleration average value is determined through the determined right and left wheel accelerations (S380).

Then a wheel acceleration weight value is determined through the wheel acceleration average value (S390). Here, a method for calculating the wheel acceleration weight value may process band-pass filter and reflect a weight value in order to reflect a wheel resonance frequency band 10 Hz to 20 Hz.

In addition, the determined value obtained by reflecting each weight value may be processed to an absolute value and then may be standardized to a maximum value of a wheel acceleration sensor (S400). In certain embodiments, the maximum value of the wheel acceleration sensor may be ±13 G.

Then the average of the vehicle body acceleration, the difference value between the right and left vehicle body accelerations, and the standardized value of the wheel acceleration is determined (S410).

Then road roughness is output from the determined average standardized value (S420).

Figure 4:
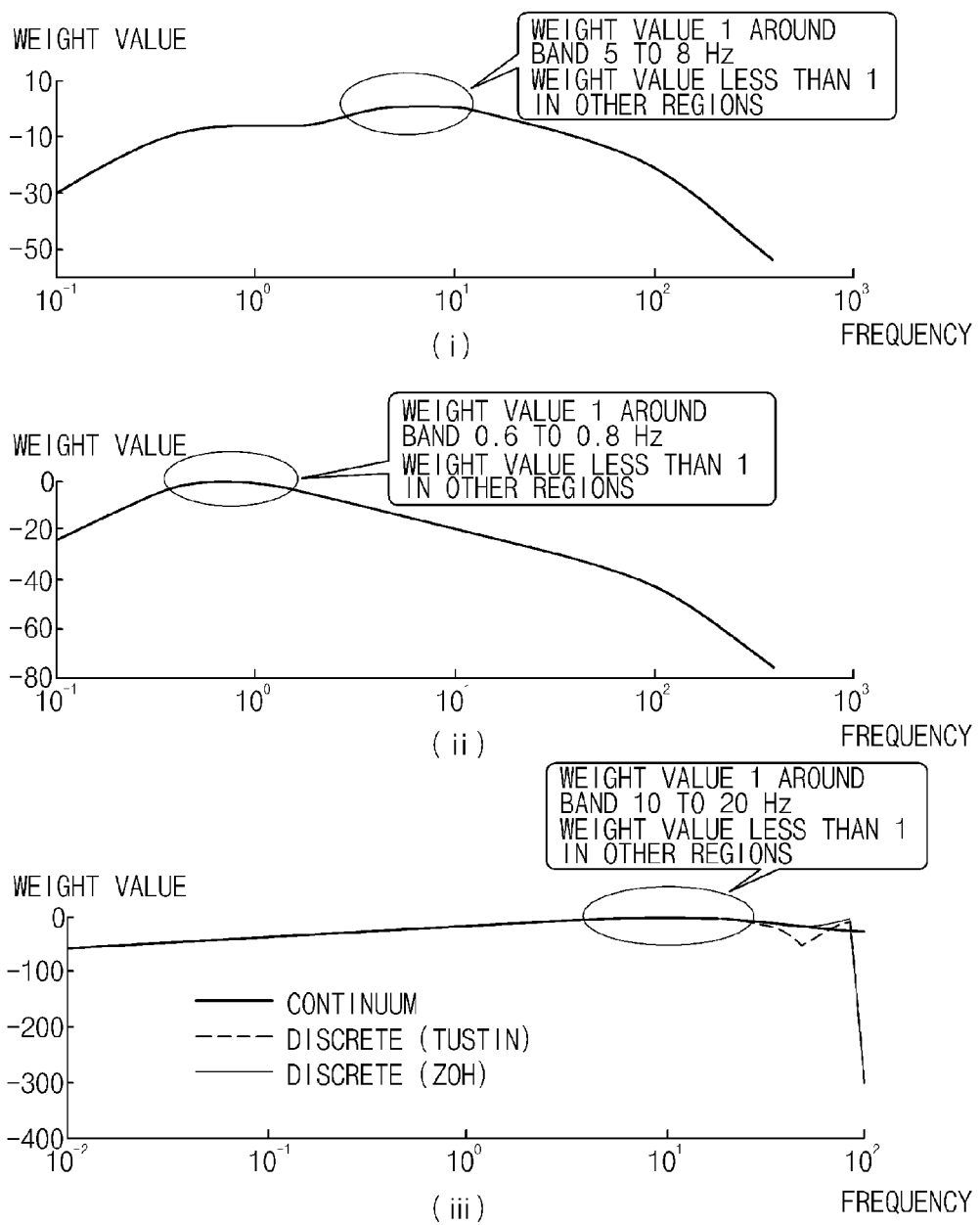
FIG. 4 is a diagram for explanation of filter characteristics for determining a road condition according to an embodiment of the present inventive concept.

FIG. 4 is a diagram for explanation of filter characteristics for determining a road condition according to an embodiment of the present inventive concept.

Referring to FIG. 4($i$), the Y axis indicates a weight value, the x axis indicates a frequency, and FIG. 4($i$) shows the characteristics of a filter for calculating a vehicle body acceleration weight value.

Referring to FIG. 4($ii$), the Y axis indicates a weight value, the x axis indicates a frequency, and FIG. 4($ii$) shows the characteristics of a filter for calculating a weight value of a difference value between right and left vehicle body accelerations.

Referring to FIG. 4($iii$), the Y axis indicates a weight value, the x axis indicates a frequency, and FIG. 4($iii$) shows the characteristics of a filter for calculating a wheel acceleration weight value.

Figure 5:
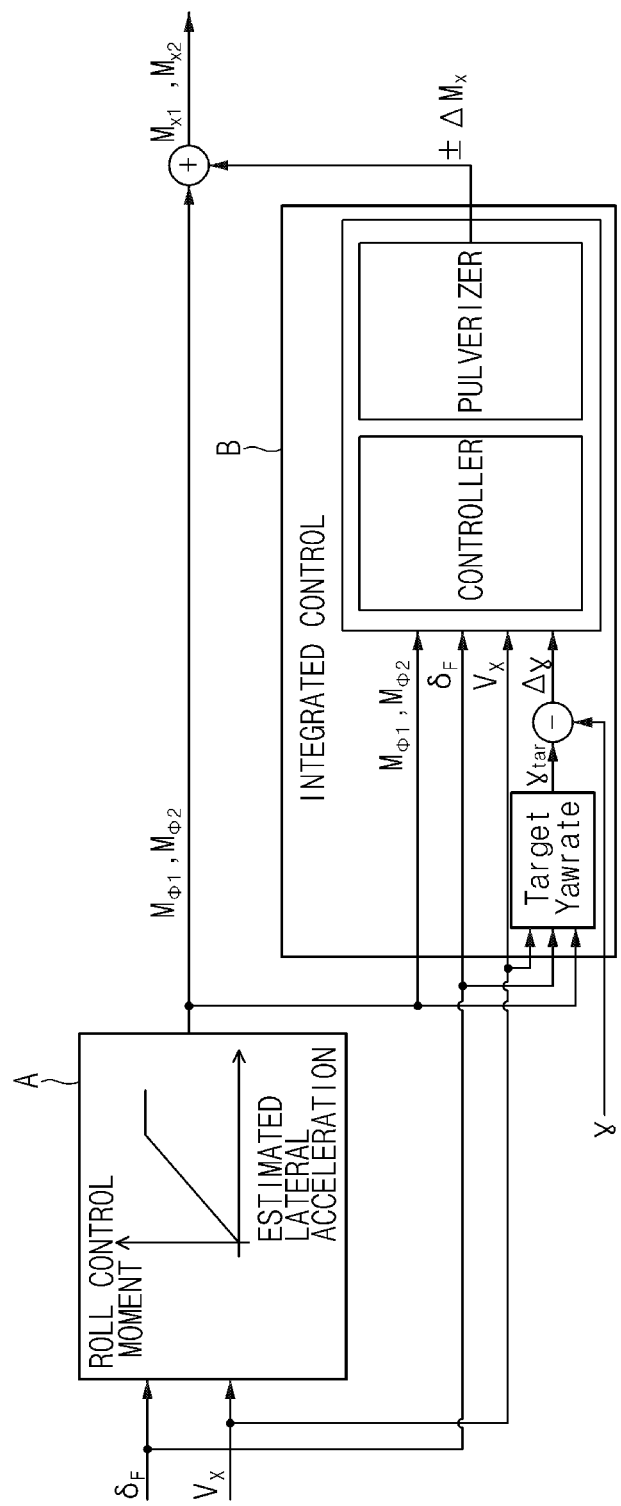
FIG. 5 is a diagram of a method for calculating a roll control moment and a yaw control moment during turning according to an embodiment of the present inventive concept.

FIG. 5 is a diagram of a method for calculating a roll control moment and a yaw control moment during turning according to an embodiment of the present inventive concept.

Referring to FIG. 5, a roll control moment amount $M_{x1}$, $M_{x2}$ in a vehicle is proportional to a lateral acceleration estimated from a steering angle $\delta_f$ and a vehicle speed $V_x$ and a roll control moment $M_{\varnothing 1}$, $M_{\varnothing 2}$ of front and rear wheels is determined from A.

When turning limit US/OS is determined, an integrated controller B may calculate an additional roll control moment amount ΔMx required for yaw control from a steering angle $\delta_f$, a vehicle speed Vx, a yaw rate error Δr, and the roll control moment Mø1, Mø2 of the front and rear wheels.

The integrated controller B may include controller and pulverizer.

In addition, the additional roll control moment amount $\Delta M_x$ required for yaw control of the integrated controller B is determined as follows.

A yaw moment amount $M_{zeq}$ for controlling turning limit US/OS is determined from the steering angle $\delta_f$, the vehicle speed Vx, and the yaw rate error $\Delta r$.

$$M_{zeq} = -I_z \left( -\frac{2(l_f C_f - 1_r C_r)}{I_z v_x} v_y - \frac{2(l_f^2 C_f - 1_r^2 C_r)}{I_z v_x} r + \frac{2 C_f L_f}{I_z} \delta_f \right) + I_z$$

$$M_{zvet} = M_{zeq} - M_{zlat} - M_{zlong}$$

$M_{zeq}$ is a total vehicle yaw moment, $M_{zlat}$ is a yaw moment by a lateral controller, $M_{zlong}$ is a yaw moment by a longitudinal controller, and $M_{zvet}$ is a yaw moment by a vertical controller.

In addition, $l_f$ is a distance to a front wheel axis from a vehicle center, $l_r$ is a distance to a rear wheel axis from the vehicle center, $I_z$ is a yaw moment of inertia, $C_f$ is cornering stiffness of front wheel tire, $C_r$ is cornering stiffness of rear wheel tire, $\delta_f$ is a steering angle, $V_x$ is a longitudinal vehicle body speed, and $V_y$ is a lateral vehicle body speed.

Additional lateral forces $\Delta Fyf$ or $\Delta Fyr$ of front and rear wheels for generating a yaw moment are determined.

In addition, vertical forces $\Delta Fzf$ or $\Delta Fzr$ of the right and left wheels for generating the additional lateral forces $\Delta Fyf$ or $\Delta Fyr$ are determined.

$$\Delta F_{zf} = \pm \sqrt{\frac{1}{K} \frac{\Delta F_{yf}}{\ddot{y}} \frac{mgL_r}{L}} \quad \Delta F_{zr} = \pm \sqrt{\frac{1}{K} \frac{\Delta F_{yr}}{\ddot{y}} \frac{mgL_f}{L}}$$

In addition, an additional roll control moment $\Delta Mxf$ or $\Delta Mxr$ is determined from the vertical forces $\Delta Fzf$ or $\Delta Fzr$ of the right and left wheels.

$$\Delta M_{xf} = \frac{T_f}{2}(\Delta F_{zFR} - \Delta F_{zFL}) \Delta M_{xr} = \frac{T_r}{2}(\Delta F_{zRR} - \Delta F_{zRL})$$

Here, m is a vehicle mass, g is a gravitational acceleration, L is a wheel base, K is a tire lateral force change sensitivity parameter according to load change, $\ddot{y}$ is a lateral acceleration, $T_f$ is a distance between front wheel axes, and $T_r$ is a distance between rear wheel axes.

In addition, a final additional roll control moment $\Delta MX$ is determined according to a turning state.

A yaw direction may be controlled using the additional roll control moment $\Delta Mx$.

Figure 6:
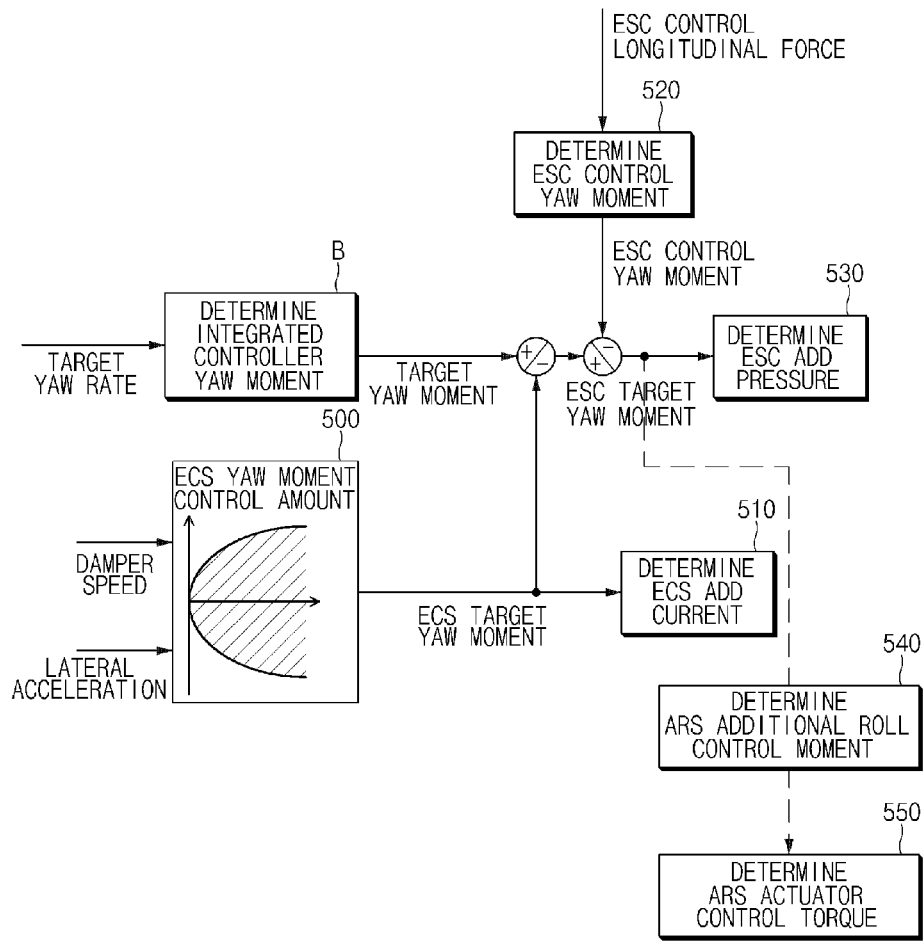
FIG. 6 is a structural diagram for explanation of a method for distributing a roll control moment and a yaw control moment to an electronic controlled suspension device (ECS) and an active roll stabilizer (ARS) according to an embodiment of the present inventive concept.

FIG. 6 is a structural diagram for explanation of a method for distributing a roll control moment and a yaw control moment to an ECS and an ARS according to an embodiment of the present inventive concept.

Referring to FIG. 6, the yaw moment amount Mzeq determined by the integrated controller B is distributed to the ECS, the ARS, and an electronic stability control (ESC).

First, a yaw moment control amount 500 generated by the ECS is determined from damper speed and lateral acceleration of a vehicle. In addition, additional current 510 generated by the ECS may be determined from the yaw moment control amount 500.

Then a yaw moment control amount 520 generated by the ESC is determined from longitudinal braking force. In addition, additional pressure 530 generated by the ESC may be determined from the yaw moment control amount 520.

Then a yaw moment control amount to be generated by the ARS is determined as the remaining yaw moment except for the aforementioned control amount generated by the ECS and the ESC.

When the yaw moment control amount to be generated by the ARS is determined, additional lateral forces of the front and rear wheels for generating a yaw moment may be determined, additional roll control moments 540 $\Delta Mxf$ or $\Delta Mxr$ may be determined from the vertical forces $\Delta Fzf$ or $\Delta Fzr$ of the right and left wheels, and actuator control torque 550 of the front and rear wheels may be determined.

As described above, according to the present inventive concept, an integrated controller may control a function between an ECS and an ARS according to a driving state so as to simultaneously improve riding impression and driving stability.

According to the present inventive concept, a roll control moment and a yaw control moment may be distributed to an ECS and an ARS so as to reduce a total control amount.

While the present inventive concept has been particularly shown and described with reference to exemplary embodiments and drawings thereof, it will be understood by those of ordinary skill in the art that various changes in form and details may be made therein without departing from the spirit and scope of the present inventive concept as defined by the following claims.

What is claimed is:

1. A method for controlling a suspension system, the method comprising controlling an electronic controlled suspension device (ECS) and an active roll stabilizer (ARS) of a vehicle based on an input sensor value and a driving operation of the vehicle,
    wherein the input sensor value is based on a road condition,
    the driving operation is one of a straight driving, a normal turning, and an urgent turning of the vehicle, and
    during the straight driving of the vehicle, when a road input signal is not generated from a road, a control mode of the ECS is a soft damping mode and a control mode of the ARS is a decouple control mode.

2. The method according to claim 1, wherein, during the straight driving of the vehicle, when the road input signal is generated from the road, the control mode of the ECS is a sky hook control mode, and the control mode of the ARS is a roll damping control mode.

3. The method according to claim 1, wherein, during the normal turning of the vehicle, when the road input signal is not generated from the road, each of the control mode of the ECS and the control mode of the ARS is a roll control mode.

4. The method according to claim 1, wherein, during the normal turning of the vehicle, when the road input signal is generated from the road, the control mode of the ECS is a sky hook control mode, and the control mode of the ARS is a roll control mode.

5. The method according to claim 1, wherein, during the urgent turning of the vehicle, when the road input signal is not generated from the road, each of the control mode of the ECS and the control mode of the ARS is a turning limit US/OS control mode.

6. The method according to claim 1, wherein, during the urgent turning of the vehicle, when the road input signal is generated from the road, the control mode of the ECS is a sky hook control mode, and the control mode of the ARS is a turning limit US/OS control mode.

7. A method for controlling a suspension system, the method comprising:
    determining whether straight driving or turning is being performed;
    determining a road condition;
    setting a control mode of an electronic controlled suspension device (ECS) and a control mode of an active roll stabilizer (ARS);

determining a roll control moment and a yaw control moment; and if it is determined that straight driving is being performed and if a road input signal is detected, extracting a low frequency road and determining a roll damping force.

8. The method of claim 7, wherein the step of determining the road condition comprises:

determining a standardized average vehicle body acceleration;

determining a standardized value of a difference between right and left vehicle body accelerations;

determining a standardized wheel acceleration;

computing an average of the standardized average vehicle body acceleration, the standardized value of the difference between the right and left vehicle body accelerations, and the standardized wheel acceleration; and outputting a road roughness value.

9. The method of claim 7, wherein the step of determining the roll control moment and the yaw control moment comprises:

computing a yaw moment amount $M_{zeq}$ using an equation, wherein the equation is $$M_{zeq} = -I_z \left( -\frac{2(l_f C_f - l_r C_r)}{I_z v_x} v_y - \frac{2(l_f^2 C_f - l_r^2 C_r)}{I_z v_x} r + \frac{2C_f L_f}{I_z} \delta_f \right) + I_z,$$

in which $l_f$ denotes a distance to a front wheel axis from a vehicle center, $l_r$ denotes a distance to a rear wheel axis from the vehicle center, $I_z$ denotes a yaw moment of inertia, $C_f$ denotes a cornering stiffness of a front wheel tire, $C_r$ denotes a cornering stiffness of a rear wheel tire, $\delta_f$ denotes a steering angle, $V_x$ denotes a longitudinal vehicle body speed, and $V_y$ denotes a lateral vehicle body speed.

10. The method of claim 7, further comprising: before the step of determining the roll control moment and the yaw control moment, determining a suspension system integrated control mode.

11. The method of claim 7, further comprising distributing the roll control moment and the yaw control moment to the ARS and the ECS.

* * * * *